United States Patent
Floes et al.

(10) Patent No.: US 11,327,814 B2
(45) Date of Patent: May 10, 2022

(54) SEMAPHORES FOR SERVERLESS COMPUTING

(71) Applicant: International Business Machines Corporation, Armonk, NY (US)

(72) Inventors: Jørgen Egbert Floes, Stenlose (DK); Clea Anne Zolotow, Key West, FL (US); Claus Schrøder-Hansen, Kbh Oe (DK); Julian Kopp, Toenisvorst (DE); Petra Kopp, Toenisvorst (DE)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/202,568

(22) Filed: Nov. 28, 2018

(65) Prior Publication Data

US 2020/0167208 A1    May 28, 2020

(51) Int. Cl.
*G06F 9/52*       (2006.01)
*G06F 9/455*      (2018.01)
*G06F 16/22*      (2019.01)

(52) U.S. Cl.
CPC .......... *G06F 9/526* (2013.01); *G06F 16/2255* (2019.01); *G06F 2009/45575* (2013.01)

(58) Field of Classification Search
None
See application file for complete search history.

(56) References Cited

U.S. PATENT DOCUMENTS

| | | | |
|---|---|---|---|
| 9,652,306 B1 * | 5/2017 | Wagner ................. | G06F 11/301 |
| 9,934,067 B2 | 4/2018 | Klee | |
| 10,193,822 B1 * | 1/2019 | Bacus ................... | H04L 47/823 |
| 10,440,145 B1 * | 10/2019 | Torun ...................... | H04L 67/32 |
| 10,460,123 B1 * | 10/2019 | Fonseka ................ | G06F 21/604 |
| 2012/0210333 A1 * | 8/2012 | Potter ................... | G06F 9/4843 |
| | | | 719/313 |
| 2014/0123136 A1 * | 5/2014 | Beda, III .............. | G06F 16/955 |
| | | | 718/1 |

(Continued)

OTHER PUBLICATIONS

Lee, Hyungro, Kumar Satyam, and Geoffrey Fox. "Evaluation of production serverless computing environments." 2018 IEEE 11th International Conference on Cloud Computing (CLOUD). IEEE, 2018. (Year: 2018).*

(Continued)

*Primary Examiner* — Matthew J Brophy
(74) *Attorney, Agent, or Firm* — Stephen R. Yuder

(57) ABSTRACT

The illustrative embodiments provide concepts for processing a function call using a solid or ephemeral code, selected using a semaphore relating to an identifying feature of the function call. The concept may include: receiving a function call, wherein the function call comprises an identifying feature; queueing the function call in a queue; selecting, using a semaphore relating to the identifying feature of the function call, a code instance of a plurality of code instances for processing a queued function call, the plurality of code instances comprising: an ephemeral code instance, wherein the ephemeral code instance is adapted to process a single function call before being discarded; and a solid code instance, wherein the solid code instance is adapted to process a function call without being discarded; and processing the queued function call with the selected code instance.

21 Claims, 5 Drawing Sheets

(56) References Cited

U.S. PATENT DOCUMENTS

| | | | |
|---|---|---|---|
| 2015/0178107 A1* | 6/2015 | Gummaraju | G06F 9/45558 718/1 |
| 2016/0239318 A1* | 8/2016 | Wagner | G06F 9/547 |
| 2016/0358103 A1 | 12/2016 | Bowers | |
| 2017/0177391 A1* | 6/2017 | Wagner | G06F 11/3668 |
| 2017/0177413 A1* | 6/2017 | Wisniewski | G06F 9/45558 |
| 2017/0199766 A1* | 7/2017 | Wagner | G06F 9/5005 |
| 2018/0060121 A1* | 3/2018 | Nassi | G06F 9/5077 |
| 2018/0101403 A1* | 4/2018 | Baldini Soares | G06Q 20/22 |
| 2018/0139238 A1* | 5/2018 | Schultz | H04L 63/1491 |
| 2018/0189090 A1* | 7/2018 | Hoppert | G06F 9/45558 |
| 2018/0203744 A1* | 7/2018 | Wiesmaier | G06F 9/5077 |
| 2018/0365036 A1* | 12/2018 | Toal | G06F 9/44558 |
| 2019/0028552 A1* | 1/2019 | Johnson, II | H04L 67/02 |
| 2019/0042315 A1* | 2/2019 | Smith | G06F 9/5077 |
| 2019/0179684 A1* | 6/2019 | On | G06F 9/546 |
| 2019/0227849 A1* | 7/2019 | Wisniewski | G06F 9/5055 |
| 2019/0324813 A1* | 10/2019 | Bogineni | G06F 9/4843 |
| 2019/0332366 A1* | 10/2019 | Natanzon | G06F 11/3696 |
| 2019/0332781 A1* | 10/2019 | Natanzon | G06F 3/0619 |
| 2020/0073783 A1* | 3/2020 | Hortala | G06F 9/54 |
| 2020/0104198 A1* | 4/2020 | Hussels | G06F 9/546 |
| 2020/0125376 A1* | 4/2020 | Kashyap | G06F 8/38 |
| 2020/0142724 A1* | 5/2020 | Wagner | G06F 11/3668 |
| 2021/0158813 A1* | 5/2021 | Sivasubramanian | G06F 40/279 |

OTHER PUBLICATIONS

Klimovic, Ana, et al. "Pocket: Elastic ephemeral storage for serverless analytics." 13th {USENIX} Symposium on Operating Systems Design and Implementation ({OSDI} 18). 2018. (Year: 2018).*

"Cloud Pub/Sub", downloaded from the internet Sep. 4, 2018, 8 pages, <https://cloud.google.com/pubsub/>.

"Gartner Hype Cycle for Emerging Technologies", 2017, 2 pages, <https://blogs.gartner.com/smarterwithgartner/files/2017/08/Emerging-Technology-Hype-Cycle-for-2017_Infographic_R6A.jpg>.

"Locks, Mutexes, and Semaphores: Types of Synchronization Objects", Oct. 21, 2014, 10 pages, <https://www.ustsoftwaresolutions.co.uk/threading/locks-mutexes-semaphores.html>.

"Semaphore (programming)", Wikipedia, This page was last edited on Aug. 30, 2018, at 13:01 (UTC), 8 pages, <https://en.wikipedia.org/wiki/Semaphore_(programming)>.

"Semaphore Translator" LingoJam, downloaded from the internet on Sep. 4, 2018, 2 pages, <https://lingojam.com/SemaphoreTranslator>.

Dijkstra, E.W., "Cooperating sequential processes" (1964), http://www.cs.utexas.edu/~EWD/indexChron.html, (Lecture Notes), Department of Mathematics, Technological University, Eindhoven, The Netherlands, <http://www.cs.utexas.edu/users/EWD/ewd01xx/EWD123.PDF> or <http://www.cs.utexas.edu/~EWD/transcriptions/EWD01xx/EWD123.html>, 87 pages.

Lee et al., "Evaluation of Production Serverless Computing Environments", provided in Search Report dated Jun. 5, 2018, <http://dsc.soic.indiana.edu/publications/Evaluation_of_Production_Serverless_Computing_Environments.pdf>.

McGrath, Garrett, "Serverless Computing: Applications, Implementation, and Performance", A Thesis Submitted to the Graduate School of the University of Notre Dame in Partial Fulfillment of the Requirements for the Degree of Master of Science in Computer Science and Engineering, 2017, 49 pages.

McLean, Alex, "Transient and ephemeral code", Posted in livecoding, rant—Mar. 4, 2013, 7 pages, <https://slab.org/transient-and-ephemeral-code/>.

Roberts, Mike, "Serverless Architectures" May 22, 2018, 48 pages, <https://martinfowler.com/articles/serverless.html#WhatIsServerless>.

Stigler M. (2018) "Understanding Serverless Computing", In: Beginning Serverless Computing, Apress, Berkeley, CA 25 pages, DOI: https://doi.org/10.1007/978-1-4842-3084-8_1.

* cited by examiner

SEMAPHORES FOR SERVERLESS COMPUTING

BACKGROUND

The present invention relates to function call processing. A function call is an expression that passes control and arguments (if any) to a function and typically has the form: expression (expression-listopt), where "expression" is either a function name or evaluates to a function address and "expression-list" is a list of expressions (separated by commas). The values of these latter expressions are the arguments passed to the function. If the function does not return a value, then it is declared to be a function that returns a void result.

Serverless computing architectures are known. As used herein in this document, the term "serverless computing" or "serverless architectures" refers to: an execution model in which a set of server computers manages the allocation of computer resources (such as virtual machines, containers, memory, processor(s), and the like) so that the server computers can accomplish the tasks required by a client of the cloud service provider. Serverless architectures are application designs that can incorporate third-party services, and/or that include custom code run in managed, ephemeral containers, VMs, or any other compute construct on a "Functions as a Service" (FaaS) platform. These architectures remove much of the need for a traditional always-on server component. Serverless architectures may benefit from significantly reduced operational cost, complexity, and engineering lead time.

Typically, serverless architectures are built to be selectively ephemeral. These architectures require all, or a portion, of their system to be serverless, that is either containerized and ephemeral, hosted by a third-party, or a Software-as-a-Service (SaaS) based service that can provide the required functionality for a given application. However, ephemeral architectures are not appropriate in all transactions. For example, the start-up time for a serverless function (which can be up to 2 minutes) may be excessive in some situations. Further, ephemeral systems are not efficient in scenarios where the same transaction is repeated many times, where the process could be optimized by sharing data between the successive transactions.

For example, retail transactions that require a tax calculation are typically performed using an ephemeral structure. However, during periods of high volume, such as the winter holiday season, many people are performing online purchases at the same time. In order to increase the efficiency of the transaction processing in this situation, the ephemeral transaction should be moved to a sustainable state.

SUMMARY

The present invention seeks to provide a method for processing a function call. Such a method includes the receiving of a function call and queueing the function call in a queue. The function call comprises an identifying feature. A code instance, of a plurality of code instances, for processing a queued function call is selected using a semaphore relating to the identifying feature of the function call. The plurality of code instances comprises an ephemeral code instance and a solid code instance. The ephemeral code instance is adapted to process a single function call before being discarded and the solid code instance is adapted to process a function call without being discarded. The method concludes by processing the queued function call with the selected code instance.

The present invention further seeks to provide a computer program product including computer program code for implementing the proposed analysis concepts when executed on a processor.

The present invention yet further seeks to provide a system (such as a processing device and/or network component) adapted to execute this computer program code.

According to further embodiments of the invention there is herein provided a computer program product for processing a function call, the computer program product comprising a computer readable storage medium having program instructions embodied therewith, the program instructions executable by a processing unit to cause the processing unit to perform a method comprising: receiving a function call, wherein the function call comprises an identifying feature; queueing the function call in a queue; selecting, using a semaphore relating to the identifying feature of the function call, a code instance of a plurality of code instances for processing a queued function call, the plurality of code instances comprising: an ephemeral code instance, wherein the ephemeral code instance is adapted to process a single function call before being discarded; and a solid code instance, wherein the solid code instance is adapted to process a function call without being discarded; and processing the queued function call with the selected code instance.

According to yet another aspect, there is provided a system for processing a function call, the system comprising: a receiving unit adapted to receive a function call, wherein the function call comprises an identifying feature; a processing unit adapted to: queue the function call in a queue; select, using a semaphore relating to the identifying feature of the function call, a code instance of a plurality of code instances for processing a queued function call, the plurality of code instances comprising: an ephemeral code instance, wherein the ephemeral code instance is adapted to process a single function call before being discarded; and a solid code instance, wherein the solid code instance is adapted to process a function call without being discarded; and process the queued function call with the selected code instance.

According to an aspect of the present invention, there is a method, computer program product and/or system that performs the following operations (not necessarily in the following order): (i) receiving a first function call instance that includes identifying feature data that identifies a first type of function call to which the first function call instance belongs; (ii) determining, based, at least in part, upon the identifying feature data, that the first function call will be performed by a set of code that is written and implemented in a solid manner such that the set of code is adapted to perform a function call without being discarded; (iii) responsive to the determination that the first function call will be performed by a set of code that is written and implemented in a solid manner, performing the first function call instance on a first set of code that is written in a solid manner to obtain first output data; (iv) outputting the first output data while maintaining the first set of code to be available for future function calls; and (v) using a first semaphore to route the first function call instance to the first set of code based upon the identifying feature data of the first function call instance.

According to an aspect of the present invention, there is a method, computer program product and/or system that performs the following operations (not necessarily in the following order): (i) receiving a first function call instance that includes identifying feature data that identifies a first type of function call to which the first function call instance belongs; (ii) determining, based, at least in part, upon the identifying feature data, that the first function call will be performed by a set of code that is written and implemented in an ephemeral manner such that the set of code is adapted to be discarded after performing a function call; (iii) responsive to the determination that the first function call will be performed by a set of code that is written and implemented in an ephemeral manner, performing the first function call instance on a first set of code that is written in an ephemeral manner to obtain first output data; (iv) outputting the first output data; (v) responsive to the outputting, discarding the first set of code; and (vi) using a first semaphore to route the first function call instance to the first set of code based upon the identifying feature data of the first function call instance.

BRIEF DESCRIPTION OF THE DRAWINGS

Preferred embodiments of the present invention will now be described, by way of example only, with reference to the following drawings, in which.

DETAILED DESCRIPTION

Figure 1:
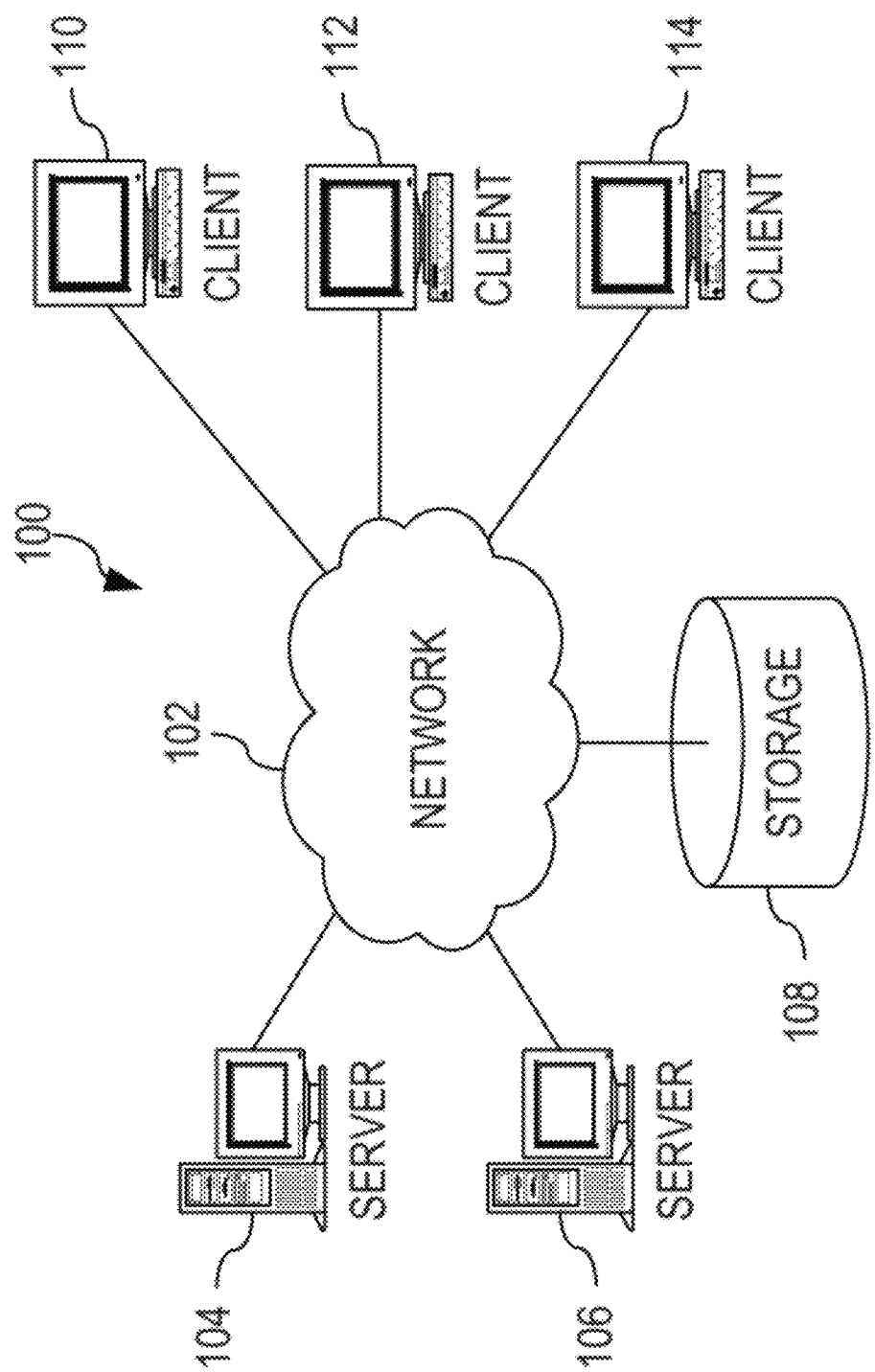
FIG. 1 is a pictorial representation of an example distributed data processing system in which aspects of the illustrative embodiments may be implemented.

It should be understood that the Figures are schematic and are not necessarily drawn to scale. It should also be understood that the same reference numerals are used throughout the Figures to indicate the same or similar parts.

With respect to embodiments of the present invention that constitute a method, it should be understood that such a method is a process for execution by a computer, (that is, the method is a computer-implementable method). The various steps or operations of the method therefore reflect various parts of a computer program (such as various portions of computer-readable and computer-executable code of one or more algorithms).

Also, with respect to a (processing) system, the system can be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Some embodiments of the present invention may recognize one, or more, of the following problems, drawbacks, shortcomings and/or opportunities for improvement with respect to the current state of the art: (i) ephemeral architectures are not appropriate in all transactions; (ii) for example, the start-up time for a serverless function (which can be up to 2 minutes) may be excessive in some situations; (iii) ephemeral systems are not efficient in scenarios where the same transaction is repeated many times, where the process could be optimized by sharing data between the successive transactions; (iv) for example, retail transactions that require a tax calculation are typically performed using an ephemeral structure; and (v) however, during periods of high volume, such as the winter holiday season, many people are performing online purchases at the same time—in order to increase the efficiency of the transaction processing in this situation, the ephemeral transaction should be moved to a sustainable state.

The illustrative embodiments provide concepts for processing a function call using a solid or ephemeral code, selected using a semaphore relating to an identifying feature of the function call. The concept may include: receiving a function call, wherein the function call comprises an identifying feature; queueing the function call in a queue; selecting, using a semaphore relating to the identifying feature of the function call, a code instance of a plurality of code instances for processing a queued function call, the plurality of code instances comprising: an ephemeral code instance, wherein the ephemeral code instance is adapted to process a single function call before being discarded; and a solid code instance, wherein the solid code instance is adapted to process a function call without being discarded; and processing the queued function call with the selected code instance.

Put another way, there is a concept for a function call processing method, wherein a solid code instance or an ephemeral code instance may be selected for processing the function call by a semaphore. The semaphore may be related to an identifying feature of the function call. Thus, the selection of an ephemeral code instance or a solid code instance may be performed based on an identifying feature of the function call.

Embodiments of the present invention enable a data processing system to receive a function call, wherein the function call comprises an identifying feature, and to queue the function call in a queue. Using a semaphore relating to the identifying feature of the function call, a code instance of a plurality of code instances may then be selected for processing a queued function call. The plurality of code instances may, for example, comprise: an ephemeral code instance, wherein the ephemeral code instance is adapted to process a single function call before being discarded; and a solid code instance, wherein the solid code instance is adapted to process a function call without being discarded. The queued function call may then be processed with the selected code instance. Embodiments may also be adapted to generate a solid code instance using an ephemeral code instance where a solid code instance has been selected for processing the function call but is not readily available. Possible semaphores may include a value representing a number of empty spaces in the queue; and a value representing a number of function calls in the queue. Further, in some embodiments, the semaphore may be adapted to select the code instance based on system information and/or previously processed function calls.

Some embodiments of the present invention provide for selecting between a solid and an ephemeral based code structure for processing function calls.

The ephemeral code structure may occupy a reduced storage area on average when compared to the solid code structure because each code instance is generated on receipt of the function call and discarded following the completion of the processing. However, processing the function call using an ephemeral code instance may typically take longer than a solid code instance. Thus, it is proposed that ephemeral code instances may be more efficient for use in periods of low volumes of function calls, whereas solid code structures may be more efficient in periods of high volume (where the processing time for each function call is reduced). Further, for certain functions, one structure may be preferable over the other. By introducing a semaphore, it is possible to control the distribution of function calls between the two code structures. Ephemeral code are any code modules that can be created enough times to make it sustainable as a code module but not enough times to make it a solid transaction. Examples of instances where using ephemeral code over solid code includes: (i) B2B (business-to-business) transactions (for example, a call from a drugstore into a drug manufacturers); (ii) authentication processes (for example, ensuring that a user or business has access to a requested resource); (iii) search functions (for example, creating a search for an item within a database while shopping); and/or (iv) calculating state taxes (as explained above).

In other words, for each function call to be processed by an ephemeral code instance, an ephemeral code may be generated to perform the required processing and then discarded upon completion. The efficiency of this approach comes from the reduced capacity required of a system that would otherwise have to store a solid code instance. Further, as the ephemeral code is not required to be executed on the home datacenter, an optimal processing space may be selected for processing the function call. However, when a recurring function call is received, it may be more efficient to use the solid code due to the reduced time taken to perform the processing.

The semaphore may be related to an identifying feature of the function call. By using a semaphore related to the function call, it may be possible to select the most efficient code instance (solid or ephemeral) for processing the function call. By way of example, the identifying feature may be related to the nature, or origin, of the function call or it may be related to the number of function calls received in a given time period.

In an embodiment, the semaphore may include a value representing a number of empty spaces in the queue. In this way, it may be possible to adjust the selection of the code instance based on the incoming number of function calls.

In an embodiment, the semaphore may include a value representing a number of function calls in the queue. This may facilitate further control of the selection of the code instance based on the incoming number of function calls.

In an embodiment, the identifying feature may include a programming language. By selecting the code instance based on a programming language used in a received function call, it may be possible to the select an optimal code instance for processing said function call.

In an embodiment, the identifying feature may include a function tag. A function tag may be used to specify what the function call is being used for.

By way of example, a function tag may relate to certain business-level information that may be desirable to process in a certain way. For example, a function tag may indicate that an amount of tax on a purchased item needs to be calculated, which may typically be processed using an ephemeral code instance. However, the function tag may be taken into account with other information, such as time of year, that indicates that the volume of purchases is likely to be higher. In this case, function calls with the tax function tag may be processed using a solid code instance instead of an ephemeral code instance.

In an embodiment, the method may further include acquiring system information and the semaphore may be adapted to select the code instance based on the system information. In this way, the selection of the code instance may be performed in an optimal way depending on the current state of the system. For example, in a scenario of high system latency or a high volume of function calls in a short time span, it may be preferable to use a solid code structure because the time taken to process each function call will be reduced.

In an embodiment, the method may further include comparing the received function call to previously received function calls and the semaphore is adapted to select the code instance based on the comparison. For frequently repeated function calls, also sometimes referred to as 'many-of-the-same' style functions, using a solid code instance may be preferable to use because it is more efficient for processing repeated functions due to the availability of cached data not otherwise available when using an ephemeral code structure.

In an embodiment, the method may further include updating the semaphore based on the selection. The processing of a function call may affect various aspects of the system, such as introducing latency into the system. By updating the semaphore based on the selection of the code instance, the subsequent selection may take account of such a change.

In an embodiment, the processing of the queued function call with the solid code instance may include: (i) performing a hash lookup in a database for an applicable solid code instance for processing the queued function call; (ii) if the hash lookup returns the applicable solid code instance, processing the queued function call using the applicable solid code instance; (iii) if the hash lookup does not return the applicable solid code instance, obtaining an ephemeral code instance for processing the queued function call; (iv) compiling the ephemeral code instance, thereby generating a solid code instance; (v) processing the queued function call using the solid code instance; (vi) assigning a tag to the solid code instance based on the queued function call; and/or (vii) storing the tagged solid code instance in the database.

In some embodiments of the present invention, the types of function calls that will be translated to solid code is dependent, in part, upon the latency inherent within a given set of ephemeral code. For example, if there is a cold start to the ephemeral code, the latency required is very high. This also applies for code that has to be started up in order to handle periods of high throughput (for example, for capacity reasons). At a certain point it is far better to create solid code for performance and capacity reasons. This point can be determined by the programmer but would usually mean that the solid code execution outperforms the ephemeral warm and cold start to a certain extent (that is, there is sometimes a 20% or above improvement in performance).

In this way, if a solid code instance has been compiled previously, the solid code instance can be recalled and used to process the function call straight away. Otherwise, the ephemeral code instance may be compiled into a solid code instance to process the current function call and/or for use with future similar function calls.

Alternatively, modifications and additional steps to a traditional function call processing implementation may also be used, which may enhance the value and utility of the proposed concepts.

Figure 2:
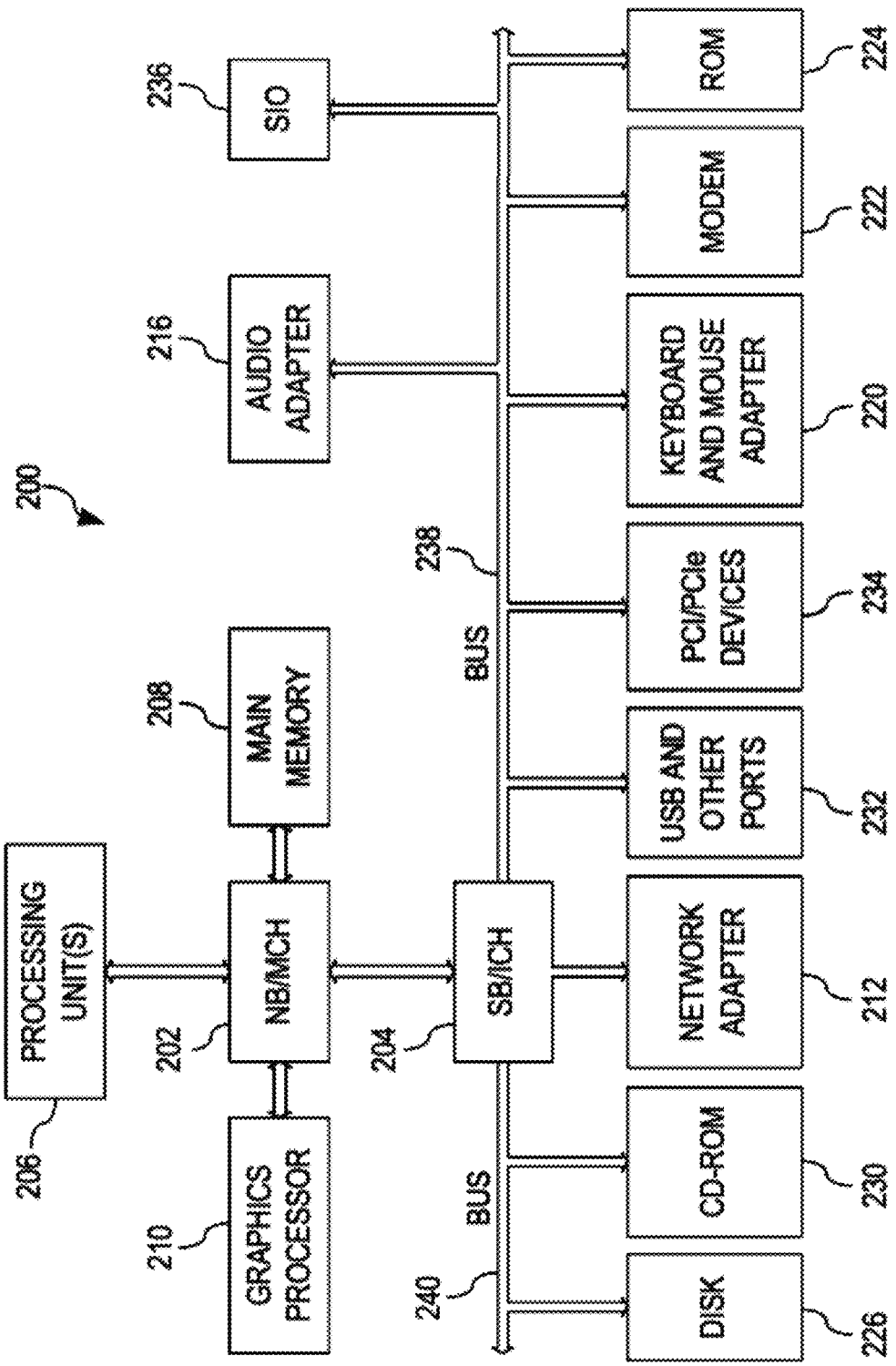
FIG. 2 is a block diagram of an example data processing system in which aspects of the illustrative embodiments may be implemented.

Embodiments of the present invention are utilized in many different types of data processing environments. In order to provide a context for the description of elements and functionality of these embodiments, FIGS. 1 and 2 are provided as example environments in which aspects of these embodiments can be implemented. It should be appreciated that FIGS. 1 and 2 are only examples and are not intended to assert or imply any limitation with regard to the environments in which aspects or embodiments of the present invention may be implemented. Many modifications to the depicted environments can be made without departing from the spirit and scope of the present invention.

FIG. 1 is a pictorial representation of an example distributed function call processing system in which aspects of the illustrative embodiments may be implemented. Distributed data processing system 100 may include a network of computers in which aspects of the illustrative embodiments may be implemented. The distributed processing system 100 contains at least one network 102, which is the medium used to provide communication links between various devices and computers connected together within distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed processing system 100 is the Internet with the network 102 representing a worldwide collection of networks and gateways that use the Transmission Control Protocol/Internet Protocol (TCP/IP) suite of protocols to communicate between and amongst each other. At the heart of the Internet is a backbone of high-speed data communication lines between major nodes or host computers, consisting of thousands of commercial, governmental, educational and other computer systems that route data and messages. Of course, the distributed processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system 200 in which aspects of the illustrative embodiments may be implemented. The data processing system 200 is an example of a computer, such as client 110 in FIG. 1, in which computer-readable code that includes instructions and data that a computer processor(s) set can execute for implementing the processes for illustrative embodiments of the present invention may be located.

In the depicted example, the data processing system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on the processing unit 206. The operating system coordinates and provides control of various components within the data processing system 200 in FIG. 2. As a client, the operating system may be a commercially available operating system. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. The data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. Similarly, one or data structures according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as first bus 238 or second bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments can be applied to multiprocessor/server systems, other than those illustrated, without departing from the scope of the embodiments of the present invention.

Moreover, the data processing system 200 can take the form of any of a number of different data processing systems including client computing devices, server computing devices, a tablet computer, laptop computer, telephone or other communication device, a personal digital assistant (PDA), or the like. In some illustrative examples, the data processing system 200 may be a portable computing device that is configured with flash memory to provide non-volatile memory for storing operating system files and/or user-generated data, for example. Thus, the data processing system 200 may essentially be any known or later-developed data processing system without architectural limitation.

One embodiment of the present invention can be used to enhance a data processing system (such as that provided in FIG. 2) by providing for the selection of an optimal code instance for processing a function call based on an identifying feature of the function call.

Figure 3:
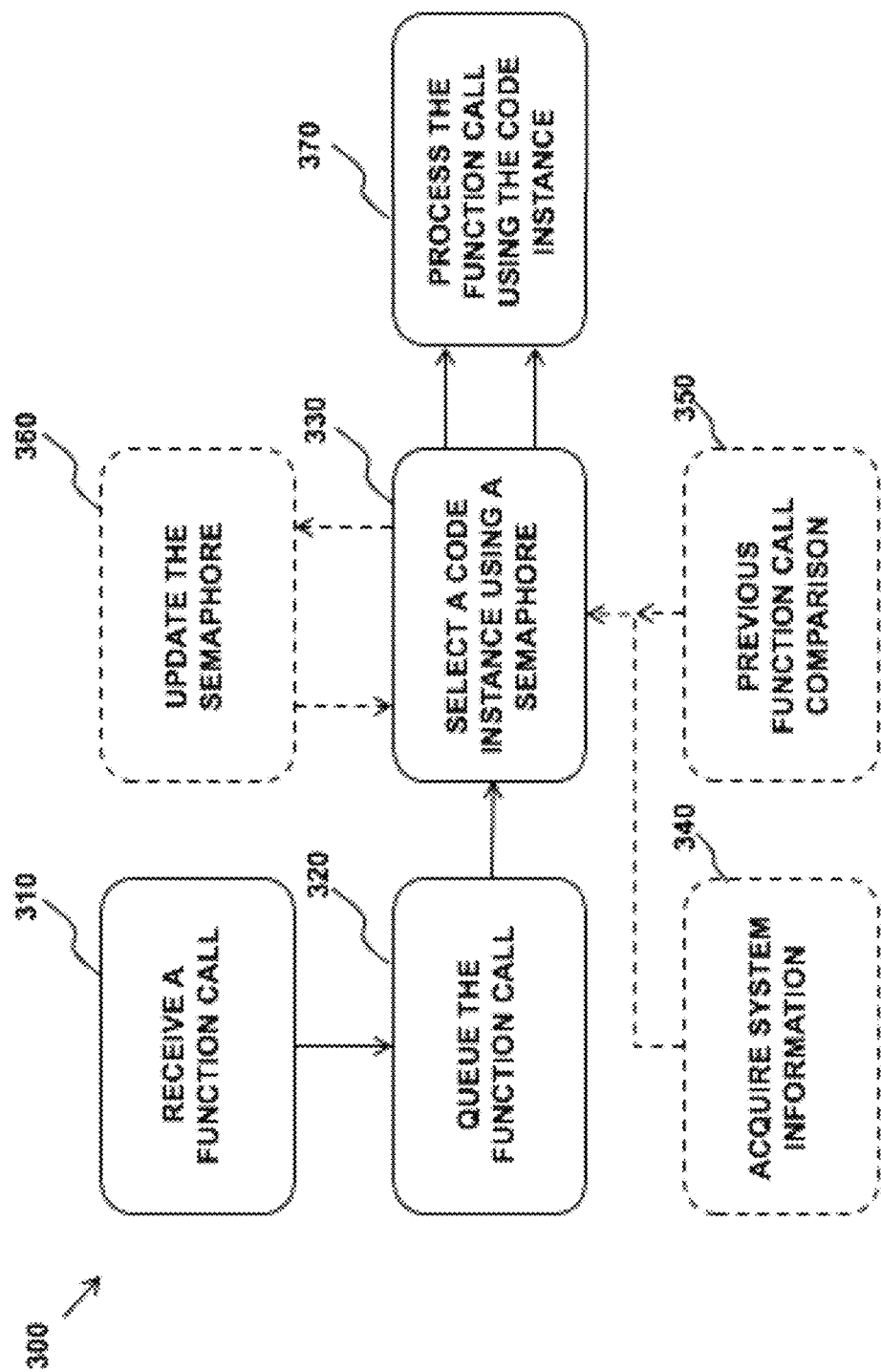
FIG. 3 is a flowchart showing a method according to one embodiment of the present invention.

FIG. 3 illustrates an exemplary method 300 for processing a function call according to a proposed embodiment. The process begins in step 310 when a function call, which can include an identifying feature, is received.

The identifying feature of the function call acts to aid the decision of a semaphore in selecting a solid code instance or an ephemeral code instance for processing the function call. In one example, the identifying feature may include a programming language, which may be used to determine an origin of the function call.

In a further example, the identifying feature may include a function tag. A function tag may include any information relating to the function call and may be used in code instance selection by the semaphore. The function call may include information relating to: an origin of the function call; a type of function call; a user identification; and the like.

In step 320, the received function call is placed in a queue.

The queue may be adapted to hold a number of function calls, thereby allowing a function call to be processed without losing further incoming function calls. The number of functions held in the queue may be adapted depending on the application of the system. For example, a system adapted to receive a high volume of function calls may have a large queue, or multiple queues; whereas, a system handling infrequent function calls may only require a small queue.

In step 330, a code instance is selected, from a plurality of code instances, for processing the function call. The selection is performed using a semaphore, which is related to the identifying feature of the function call.

A "semaphore," as that term is used throughout this document, is defined as a variable, or abstract data type, used to control access to a common resource. In other words, the semaphore controls the access of the functional call to the plurality of code instances for processing. Consequently, the semaphore controls the code instance used to process the function call and so may select the most appropriate code instance according to a given situation.

The plurality of code instances includes an ephemeral code instance, or a plurality of ephemeral code instances. An "ephemeral code instance," as that term is used throughout this document, is defined as a code instance that is generated to process a single function call before being discarded. The ephemeral code instance may be generated upon receipt of the function call. Alternatively, the ephemeral code instance may already exist in a solid code environment, wherein it is activated upon receipt of the function call.

In periods of low numbers of incoming function calls, the ephemeral code instances of a serverless architecture will be more efficient, in terms of both computing power and cost, and consume less storage capacity.

The plurality of code instances also includes a solid code instance, or a plurality of solid code instances. A "solid code instance," as that term is used throughout this document, is defined as a code instance that is adapted to process a function call without being discarded. In other words, a given solid code instance may be repeatedly re-used to process function calls of the same type.

The processing duration per function call will improve when using a solid code instance compared to an ephemeral code instance. Thus, the time taken to process a function call will be shorter, which is particularly relevant in situations where a high volume of function calls is received.

Further, in long living processing environments, or solid environments, cached data can further improve transaction duration. This is particularly relevant in situations where function calls of a similar nature are frequently received.

In a typical distributed system architecture, incoming function calls will be processed using an ephemeral code instance. By adding a semaphore to select between a solid and an ephemeral code instance, it is possible to redirect the function calls to the solid code instance instead of the ephemeral code instance based on any number of criteria. These criteria may be contained in a database and indexed with a hash binary lookup. In addition, learning algorithms may be utilized to measure and forecast system behaviour in order to learn when semaphores according to these criteria should be invoked from the database.

By way of example, the semaphore criteria may include a value representing a number of empty spaces in the queue and/or a number of function calls in the queue. In this case, a code instance may be selected based on the number of function calls awaiting processing in the queue and/or how full the queue is. In the case of multiple queues, the semaphore may comprise such values for each queue.

For example, in the case where a queue is nearly full, a solid code instance may be selected for processing the function calls in an attempt to clear the queue to allow more function calls to be received.

In step 340, system information may be acquired. In this case, the semaphore may be adapted to select the code instance based on the system information.

In some embodiments, the system information includes a measure of system latency, wherein the system latency relates to the time taken to process a function call. In periods of high function call volume, the system latency may increase above a predetermined threshold. In this case, the semaphore may begin selecting a solid code instance for processing the function calls in the queue, due to the faster processing speeds, until the latency of the system has reduced to an acceptable level.

In step 350, the received function call may be compared to previously received function calls. In this case, the semaphore may be adapted to select the code instance based on the comparison.

By way of example, a number of function calls may be received that all require a similar processing function. If this were to be performed using an ephemeral code instance, the code instance would need to be generated, or activated, each time a similar function call is received, which may be inefficient. Alternatively, the same solid code instance may be used for each similar function call received. Thus, when a given number of similar function calls are received, the semaphore may select a solid code instance to process future similar function calls.

In step 360, the semaphore may be updated based on the selection of a code instance for processing a function call. Thus, the semaphore may actively adapt to previous selection decisions based on a number of criteria as mentioned above.

In step 370, the queued function call is processed with the selected code instance.

The following example is directed to a high function call volume situation, where many of the same type of function call may be processed using a solid code instance. However, it is noted that there may be other elements which can trigger the semaphore to select a given code instance due to pre-coded events or a need for improved performance compared to scalability.

In this example, a function call is generated (by way of a coder) and passed to another process to receive and execute the model (by way of an executor). The coder and the executor communicate using a queue of maximum size N. It should be noted that there could be a plurality of queues for executor. The coder and executer are subject to the following conditions: (i) the coder must wait for the executor to produce something if the queue is empty; and (ii) the coder must wait for the executor to accept a function call if the queue is full. In this case, the semaphore tracks the state of the queue with two sub-semaphores: emptyCount, the number of empty places in the queue; and fullCount, the number of elements in the queue.

To maintain integrity, emptyCount may be lower (but never higher) than the actual number of empty places in the queue, and fullCount may be lower (but never higher) than the actual number of items, or function calls, in the queue. Empty places and items represent two kinds of resources, empty boxes and full boxes, and the sub-semaphores emptyCount and fullCount maintain control over these resources. An additional binary semaphore, useQueue, ensures that the integrity of the state of the queue itself is not compromised, for example by two coders attempting to add function calls to an empty queue simultaneously, thereby corrupting its internal state. Alternatively, a mutex could be used in place of the additional binary semaphore.

The emptyCount is initially N, fullCount is initially 0, and useQueue is initially 1. When fullCount approaches N, the queue approaches full capacity, indicating that a solid code instance may be preferable to allow the queue to empty. Further, it may be possible to have an additional queue for monitoring a latency count (which may trigger the semaphore to select a solid code instance). There may also be a queue for function calls having a given function tag. For example, the function tag may represent certain business processes (such as Value Added Tax calculations) that may trigger the semaphore to select a solid code instance. The solid code instance may execute on dedicated (or different) hardware to ensure desirable execution times.

As stated above, several events may trigger the selection of a solid code instance. By way of example, these events may include: (i) the repeated execution of a particular code instance (such as a repeated tax calculation); (ii) the latency of processing function calls exceeding a predetermined threshold during high traffic, wherein changing the processing of the function calls from an ephemeral code instance to a solid code instance may reduce latency as code generation would not be needed; (iii) a rare event occurring that requires additional computational capability and lower latency (such as everyone decides to check their bank balance on Tuesday at 3 PM); and/or (iv) previously planned events that drive a pre-coded behavior of the semaphore (such as a sale in a retail setting), where larger portions of the transactions could be processed using a solid code instance; and the like.

Figure 4:
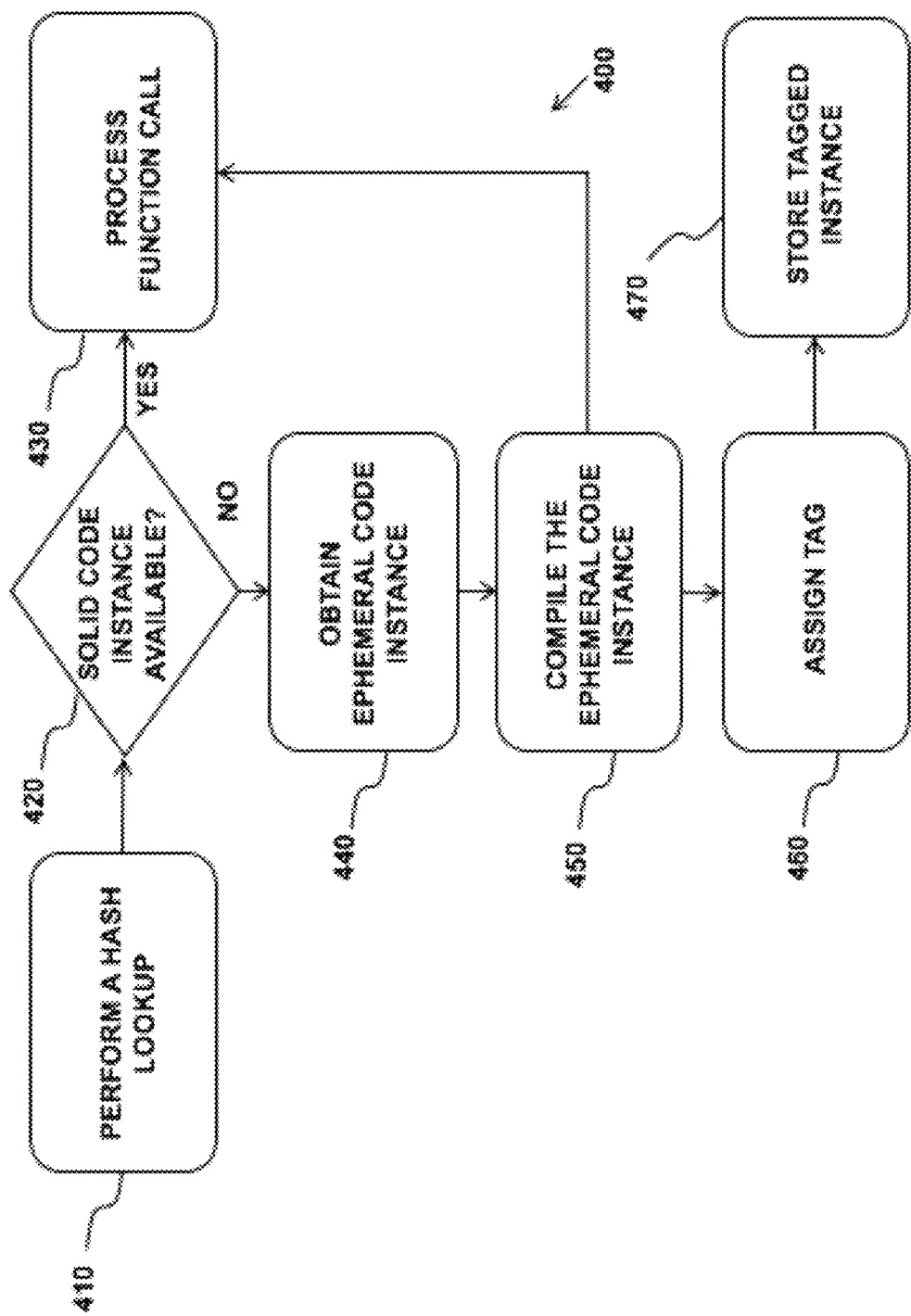
FIG. 4 is a flowchart showing a method according to another embodiment of the present invention.

FIG. 4 is a flowchart showing method 400 for processing the queued function call with the solid code instance according to an embodiment of the present invention. The process begins in step 410, wherein a hash lookup is performed, in a database, for an applicable solid code instance for processing the queued function call.

In step 420, it is determined whether the hash lookup returns the applicable solid code instance. If the hash lookup does indeed return the appropriate solid code instance, the method progresses to step 430, wherein the queued function call is processed using the applicable solid code instance.

However, if the hash lookup does not return an applicable solid code instance that is suitable for processing the function call, the method proceeds to step 440, wherein an ephemeral code instance for processing the queued function call is obtained. The ephemeral code instance may be freshly generated, or it may be activated from within a solid environment.

As the semaphore has indicated that the function call should be processed by a solid code instance, the ephemeral code instance is compiled in step 450, thereby generating a solid code instance.

In other words, if the hash lookup does not return a suitable solid code instance for processing the function call, the system may generate a suitable solid code instance for processing the function call by generating an ephemeral function call and compiling it.

For example, a semaphore may be adapted to select a solid code instance for processing a function call having a function tag relating to tax calculations. Upon performing the hash lookup for solid code instances suitable for performing a tax calculation, the database may return that no such solid code instances are available.

Accordingly, an ephemeral code instance may be generated that is suitable for processing the tax calculation function call. The ephemeral code instance may then be compiled to form a solid code instance. Thus, a solid code instance suitable for processing the function call is now available.

The method then progresses to step 430, wherein the queued function call is processed using the newly generated solid code instance.

Further, the method progresses to step 460, wherein a tag is assigned to the newly generated solid code instance based on the queued function call. In the example described above, the solid code instance may be assigned a tag denoting that it is suitable for processing function calls relating to tax calculations.

In step 470, the tagged solid code instance is then stored in the database. Thus, when future similar function calls are received, for example, a subsequent function call including the tax calculation tag, the tagged solid code instance may be retrieved from the database by the hash lookup.

Figure 5:
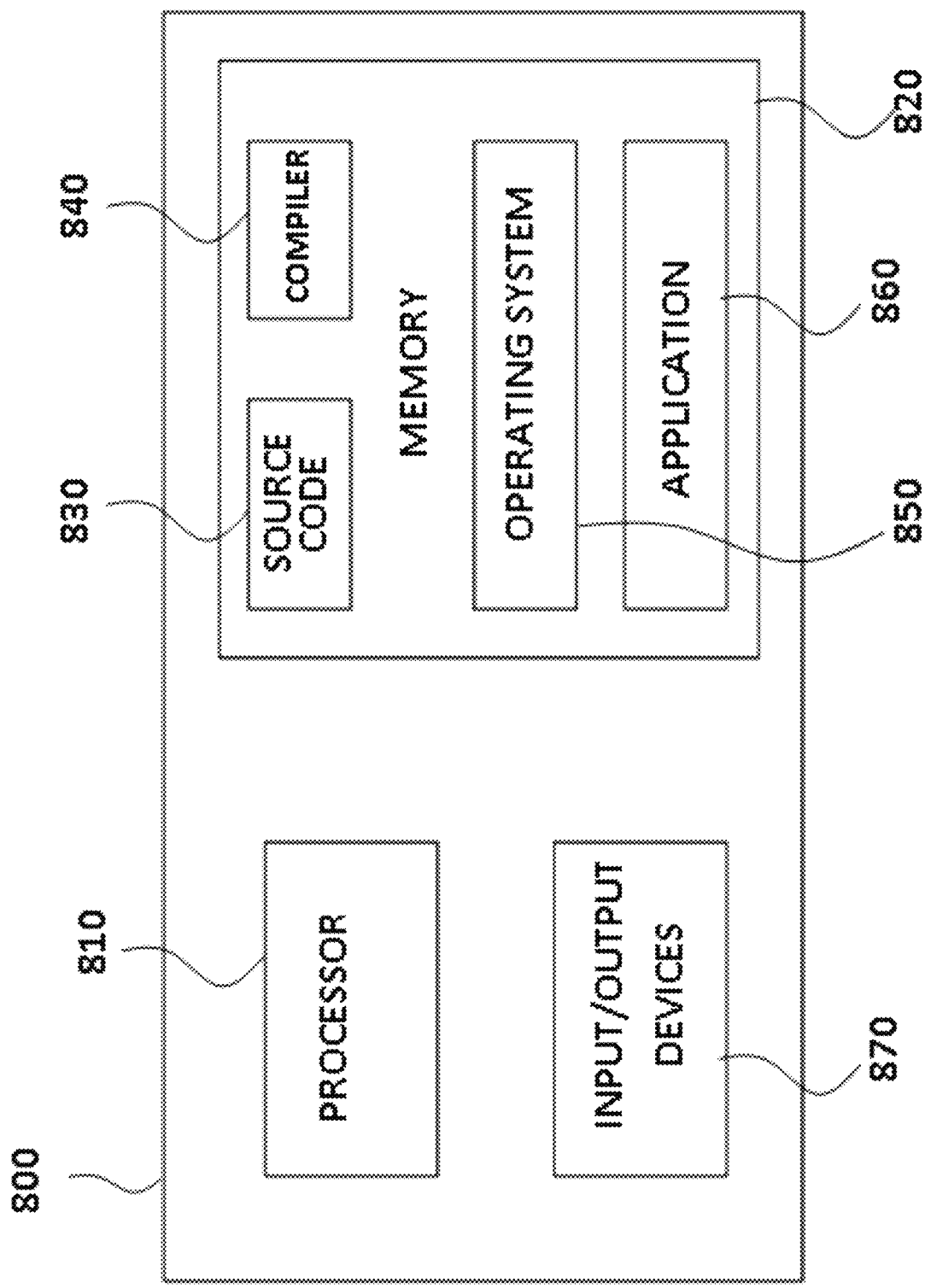
FIG. 5 illustrates an example of a computer within which one or more parts of an embodiment may be employed.

FIG. 5 illustrates an example of a computer 800 within which one or more parts of an embodiment may be employed. Various operations discussed above may utilize the capabilities of the computer 800. For example, one or more parts of a system for generating textual response data by analyzing the response text may be incorporated in any element, module, application, and/or component discussed herein.

The computer 800 includes, but is not limited to, PCs, workstations, laptops, PDAs, palm devices, servers, storages, and the like. Generally, in terms of hardware architecture, the computer 800 may include one or more processors 810, memory 820, and one or more I/O devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a digital signal processor (DSP), or an auxiliary processor among several processors associated with the computer 800, and the processor 810 may be a semiconductor based microprocessor (in the form of a microchip) or a microprocessor.

The memory 820 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and one or more applications 860 in accordance with exemplary embodiments. As illustrated, the application 860 comprises numerous functional components for implementing the features and operations of the exemplary embodiments. The application 860 of the computer 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated by the inventors that the application 860 for implementing exemplary embodiments may be applicable on all commercially available operating systems.

Application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer 800 is a PC, workstation, intelligent device or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 860 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

In the context of the present application, where embodiments of the present invention constitute a method, it should be understood that such a method is a process for execution by a computer, that is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Some helpful default definitions follow.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

What is claimed is:

1. A computer-implemented method (CIM) for processing a function call, the method comprising:
    receiving a function call, wherein the function call includes an identifying feature indicating to the number of function calls received in a specified period of time;
    queueing the function call in a queue to obtain a queued function call;
    identifying a semaphore including a value representing a number of queued function calls in the queue;
    selecting a code instance of a plurality of code instances for processing the queued function call based, at least in part, upon the number of queued function calls indicated by the semaphore and the number of function calls received the plurality of code instances comprising:
        an ephemeral code instance, wherein the ephemeral code instance is adapted to process a single function call before being discarded, and
        a solid code instance, wherein the solid code instance is adapted to process a function call without being discarded; and
    processing the queued function call with the selected code instance;
    wherein the semaphore is used to control the distribution of function calls between ephemeral code instances and solid code instances according to a threshold amount of function calls to be processed during the specified period of time, and with the threshold amount of function calls being exceeded when a first planned event drives a pre-coded behavior of the semaphore.

2. The CIM of claim 1, wherein the semaphore further includes a value representing a number of empty spaces in the queue.

3. The CIM of claim 1, wherein the identifying feature further indicates a programming language.

4. The CIM of claim 1, wherein the identifying feature further comprises a function tag.

5. The CIM of claim 1, wherein the method further comprises acquiring system information and wherein the semaphore is adapted to select the code instance based on the system information.

6. The CIM of claim 1, wherein the method further comprises comparing the received function call to previously received function calls and wherein the semaphore is adapted to select the code instance based on the comparison.

7. The CIM of claim 1, wherein the method further comprises updating the semaphore based on the selection.

8. A computer program product (CPP) comprising:
    a machine readable storage medium; and
    computer code stored on the machine readable storage medium, with the computer code including instructions and data for causing the processor(s) set to perform operations including the following:
        receiving a function call, wherein the function call comprises an identifying feature indicating to the number of function calls received in a specified period of time;
        queueing the function call in a queue to obtain a queued function call;
        identifying a semaphore including a value representing a number of queued function calls in the queue;
        selecting a code instance of a plurality of code instances for processing the queued function call based, at least in part, upon the number of queued function calls indicated by the semaphore and the number of function calls received the plurality of code instances comprising:
            an ephemeral code instance, wherein the ephemeral code instance is adapted to process a single function call before being discarded, and
            a solid code instance, wherein the solid code instance is adapted to process a function call without being discarded; and
        processing the queued function call with the selected code instance;
        wherein the semaphore is used to control the distribution of function calls between ephemeral code instances and solid code instances according to a threshold amount of function calls to be processed during the specified period of time, and with the threshold amount of function calls being exceeded when a first planned event drives a pre-coded behavior of the semaphore.

9. The CPP of claim 8, wherein the semaphore further includes a value representing a number of empty spaces in the queue.

10. The CPP of claim 8, wherein the identifying feature further indicates a programming language.

11. The CPP of claim 8, wherein the identifying feature further comprises a function tag.

12. The CPP of claim 8, wherein the method further comprises acquiring system information and wherein the semaphore is adapted to select the code instance based on the system information.

13. The CPP of claim 8, wherein the method further comprises comparing the received function call to previously received function calls and wherein the semaphore is adapted to select the code instance based on the comparison.

14. The CPP of claim 8, wherein the method further comprises updating the semaphore based on the selection.

15. A computer system (CS) comprising:
a processor(s) set;
a machine readable storage device; and
computer code stored on the machine readable storage device, with the computer code including instructions and data for causing the processor(s) set to perform operations including the following:
- receiving a function call, wherein the function call comprises an identifying feature indicating to the number of function calls received in a specified period of time;
- queueing the function call in a queue to obtain a queued function call;
- identifying a semaphore including a value representing a number of queued function calls in the queue;
- selecting a code instance of a plurality of code instances for processing the queued function call based, at least in part, upon the number of queued function calls indicated by the semaphore and the number of function calls received the plurality of code instances comprising:
  - an ephemeral code instance, wherein the ephemeral code instance is adapted to process a single function call before being discarded, and
  - a solid code instance, wherein the solid code instance is adapted to process a function call without being discarded; and
- processing the queued function call with the selected code instance;
- wherein the semaphore is used to control the distribution of function calls between ephemeral code instances and solid code instances according to a threshold amount of function calls to be processed during the specified period of time, and with the threshold amount of function calls being exceeded when a first planned event drives a pre-coded behavior of the semaphore.

16. The CS of claim 15, wherein the semaphore further includes a value representing a number of empty spaces in the queue.

17. The CS of claim 15, wherein the identifying feature further indicates a programming language.

18. The CS of claim 15, wherein the identifying feature further comprises a function tag.

19. The CS of claim 15, wherein the method further comprises acquiring system information and wherein the semaphore is adapted to select the code instance based on the system information.

20. The CS of claim 15, wherein the method further comprises comparing the received function call to previously received function calls and wherein the semaphore is adapted to select the code instance based on the comparison.

21. The CS of claim 15, wherein the method further comprises updating the semaphore based on the selection.

* * * * *